United States Patent
Wigren et al.

(10) Patent No.: US 7,676,232 B2
(45) Date of Patent: Mar. 9, 2010

(54) ALTITUDE DETERMINATION AND DISTRIBUTION IN CELLULAR COMMUNICATION SYSTEMS

(75) Inventors: Karl Torbjörn Wigren, Uppsala (SE); Anders Lundqvist, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1950 days.

(21) Appl. No.: 10/146,463

(22) Filed: May 16, 2002

(65) Prior Publication Data

US 2004/0203856 A1    Oct. 14, 2004

(51) Int. Cl.
*H04W 24/00* (2009.01)

(52) U.S. Cl. ............... 455/456.1; 455/456.5; 455/456.6

(58) Field of Classification Search .............. 455/456.1, 455/67.11, 115.1; 701/214
See application file for complete search history.

(56) References Cited

U.S. PATENT DOCUMENTS

| | | | | |
|---|---|---|---|---|
| 5,604,765 A * | 2/1997 | Bruno et al. | ................. | 375/141 |
| 6,012,013 A * | 1/2000 | McBurney | ................. | 701/207 |
| 6,061,018 A | 5/2000 | Sheynblat | | |
| 6,518,918 B1 * | 2/2003 | Vannucci et al. | ........ | 342/357.06 |
| 6,597,906 B1 * | 7/2003 | Van Leeuwen et al. | ... | 455/422.1 |
| 6,756,938 B2 * | 6/2004 | Zhao et al. | ............. | 342/357.09 |
| 6,832,093 B1 * | 12/2004 | Ranta | ...................... | 455/456.4 |
| 2003/0054813 A1 * | 3/2003 | Riley et al. | .................. | 455/424 |
| 2003/0086512 A1 * | 5/2003 | Rick et al. | ................... | 375/343 |
| 2003/0148761 A1 * | 8/2003 | Gaal | .......................... | 455/423 |
| 2004/0189521 A1 * | 9/2004 | Smith et al. | ................. | 342/387 |
| 2005/0075111 A1 * | 4/2005 | Tafazolli et al. | .......... | 455/456.1 |

FOREIGN PATENT DOCUMENTS

WO    WO 0195152 A1    12/2001

OTHER PUBLICATIONS

International Search Report PCT/SE 03/00731.

* cited by examiner

*Primary Examiner*—Temica M Beamer
(74) *Attorney, Agent, or Firm*—Nixon & Vanderhye P.C.

(57) ABSTRACT

In the present invention, data of a digital altitude map of a cell in a cellular communication system is compressed in a first node by defining a polygon essentially representing the boundary of the cell. Each polygon corner is defined by a point having two lateral coordinates and an associated altitude parameter. In this manner a set of at least three points is defined. This set of points constitutes a relatively limited amount of data, which easily can be transferred over an interface to a second node. In the second node, the set of points is used as parameters for creating an altitude model. By using a pair of lateral coordinates as input arguments of the model, an estimation of an associated altitude can be derived.

57 Claims, 8 Drawing Sheets

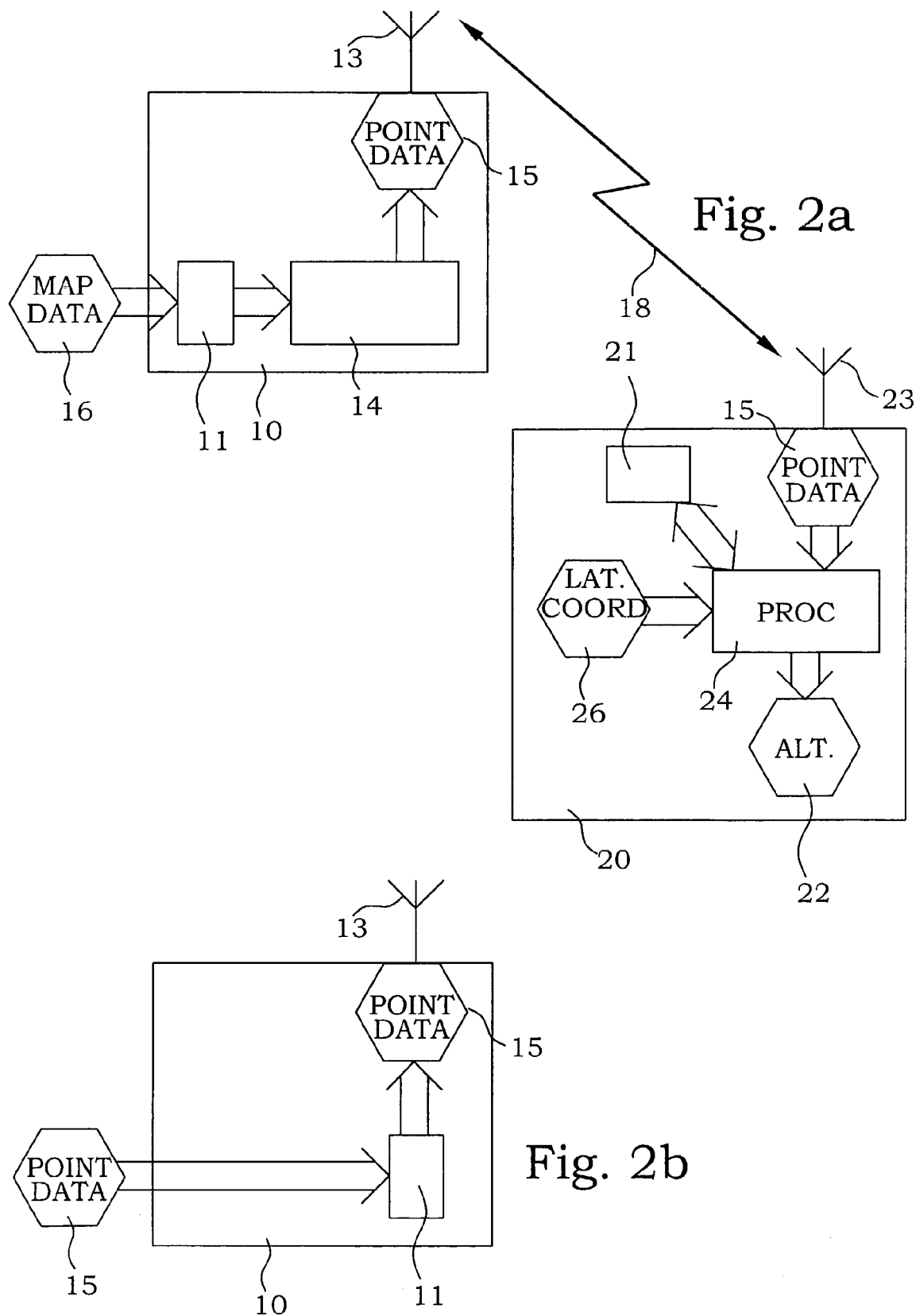

| 8 | 7 | 6 | 5 | 4 | 3 | 2 | 1 | |
|---|---|---|---|---|---|---|---|---|
| HEADER | | | | NO. POINTS | | | | OCTET 1 |
| S | LATITUDE POINT 1 | | | | | | | OCTET 2 |
| | | | | | | | | OCTET 3 |
| | | | | | | | | OCTET 4 |
| LONGITUDE POINT 1 | | | | | | | | OCTET 5 |
| | | | | | | | | OCTET 6 |
| | | | | | | | | OCTET 7 |
| D | ALTITUDE POINT 1 | | | | | | | OCTET 8 |
| | | | | | | | | OCTET 9 |

⋮

| S | LATITUDE POINT N | | | | | | | OCTET 8N-6 |
|---|---|---|---|---|---|---|---|---|
| | | | | | | | | OCTET 8N-5 |
| | | | | | | | | OCTET 8N-4 |
| LONGITUDE POINT N | | | | | | | | OCTET 8N-3 |
| | | | | | | | | OCTET 8N-2 |
| | | | | | | | | OCTET 8N-1 |
| D | ALTITUDE POINT N | | | | | | | OCTET 8N |
| | | | | | | | | OCTET 8N+1 |

Fig. 8

ALTITUDE DETERMINATION AND DISTRIBUTION IN CELLULAR COMMUNICATION SYSTEMS

TECHNICAL FIELD

The present invention relates in general to geographical information distribution in a cellular communication system, and in particular to geographical altitude determination and distribution.

BACKGROUND

In a cellular communication system, there is need for distribution of a lot of different information between different nodes, stationary as well as mobile. One type of information that has become more and more interesting is the location of a mobile unit. Up to now, the lateral position, i.e. the position in a horizontal plane, e.g. the latitude and longitude of the position has encountered most interest, but also the altitude is of increasing importance.

One typical application, where altitude determination becomes important is in the position determination of a mobile unit. By using travelling time measurements for signals travelling to a mobile unit from a number of base stations, a number of distances are thus determined. Each distance corresponds to a circle around each base station and the mobile position can in principle be determined as the common intersection of all circles. For a perfectly flat surface, distance measurements from at least three base stations are needed in order to secure a unique intersection. If the altitude of the mobile differs considerably from the altitude of at least one of the base stations, also the third dimension has to be considered. The distances then generate spheres, and to fully and uniquely determine the position of the mobile station, at least four measurements are needed. However, since the altitudes of the base stations typically are relatively similar, the accuracy in altitude determination becomes poor. Addition of the altitude information in any other way may improve and simplify the position determination of a mobile station.

Different approaches for distributing and using altitude information may be possible, and one possibility would e.g. be to concentrate on using the present lateral position and pre-established altitude maps to obtain the present altitude by a table lookup. A stationary node may easily digitally store such map data related to the area associated with its own cell. However, mobile units, moving from one cell to another, can not generally store altitude maps for all possible cells. Also when a stationary node needs information about an altitude of a position outside its own cell, all information may not be stored within the same unit in practical cases. Altitude information thus typically has to be communicated between different nodes in a cellular communication system.

One possible solution is that if a mobile unit wants to determine its altitude, the mobile unit communicates with a stationary unit, sending e.g. its present lateral position coordinates. The stationary unit processes the coordinates and returns an altitude value. However, if there is a need for an intermittently updated altitude determination, a lot of signaling has to be performed, which requires a certain bandwidth and hence reduces the remaining capacity of the cellular communication system, in particular when many users are active. It may therefore be a better solution if the mobile unit by itself may be able to determine the altitude, with a minimum of repeated communication.

An approach to such a solution is to communicate data representing an altitude map from a stationary node to the mobile station, when the mobile station enters into a certain cell, e.g. together with a handover procedure.

SUMMARY

One problem with the approach of letting e.g. a mobile unit make an altitude estimation, employing digital map data, is that a complete digital altitude map of a cell represents a huge amount of data. Communicating all this information from a stationary node to a mobile unit during e.g. a handover procedure may put unreasonable burdens on the communication resources.

An object of the present invention is thus to provide for a transfer of reasonably accurate altitude information between different nodes in a cellular communication system without occupying large communication resources. A further object is to provide for compressing the amount of altitude data into a limited number of parameters. Another object of the present invention is to provide for such a data transfer between nodes of different types or provided by different manufacturers. Another further object of the present invention is to enable use of algorithms of different accuracy, depending on e.g. the processing capacity of the nodes. Yet a further object of the present invention is to provide a communication format, which is suitable for supporting a variety of altitude determination algorithms.

The above objects are achieved by methods, systems, nodes and formats according to the enclosed patent claims. In general words, the data of a digital altitude map of a cell is compressed in a first node by defining a polygon representing the boundary of the cell. A point having two coordinates in a horizontal plane, e.g. latitude and longitude, and an associated altitude parameter defines each polygon corner. In this manner a set of at least three points is defined. This set of points is a relatively limited amount of data, which easily can be transferred to a second node by signals over an interface. In the second node, the set of points is used as parameters for creating an altitude model. By using a pair of lateral coordinates as input arguments of the model, an estimation of an associated altitude can be derived.

In a simple case, the altitude parameter of the points transferred between the nodes is the true altitude of the corresponding position according to an altitude map. However, more elaborate algorithms comprise optimization of the altitude parameter with respect to points of the interior of the cell, and preferably also with respect to points in neighboring cells as well. Since such calculations may be performed once-and-for-all in the first node, the optimization algorithms may be quite advanced. Piecewise linear models, polynomial models in two variables and spline models are examples of different useful embodiments of models and can be used together with a variety of different optimization methods and optimization criteria.

In the second node, where the altitude estimation is performed, preferably a mobile unit, different altitude models can be used, e.g. piecewise linear models, polynomial models in two variables or spline models. The choice of model can be adapted to the processing performance of the second node. Preferably, the second node uses the same altitude model as is used in the first node to provide the optimized set of points.

In a preferred embodiment, the format of the signals over the data transfer interface is a generalization of the 3GPP GAD formats, where lateral coordinates are compatible with the 3GPP GAD polygon format and the altitude parameter is compatible with the 3GPP GAD ellipsoid point with altitude format.

BRIEF DESCRIPTION OF THE DRAWINGS

The invention, together with further objects and advantages thereof, may best be understood by making reference to the following description taken together with the accompanying drawings, in which:

FIG. 2a is a schematic illustration of the data flow in devices according to the present invention;

FIG. 2b is a schematic illustration of another embodiment of a first node according to the present invention;

FIG. 7b is a flow diagram illustrating a preferred embodiment of one of the steps of FIG. 7a;

FIG. 7c is a flow diagram illustrating a preferred embodiment of another of the steps of FIG. 7a;

FIG. 8 is an illustration of a preferred communication format of data according to the present invention;

DETAILED DESCRIPTION

Figure 1:
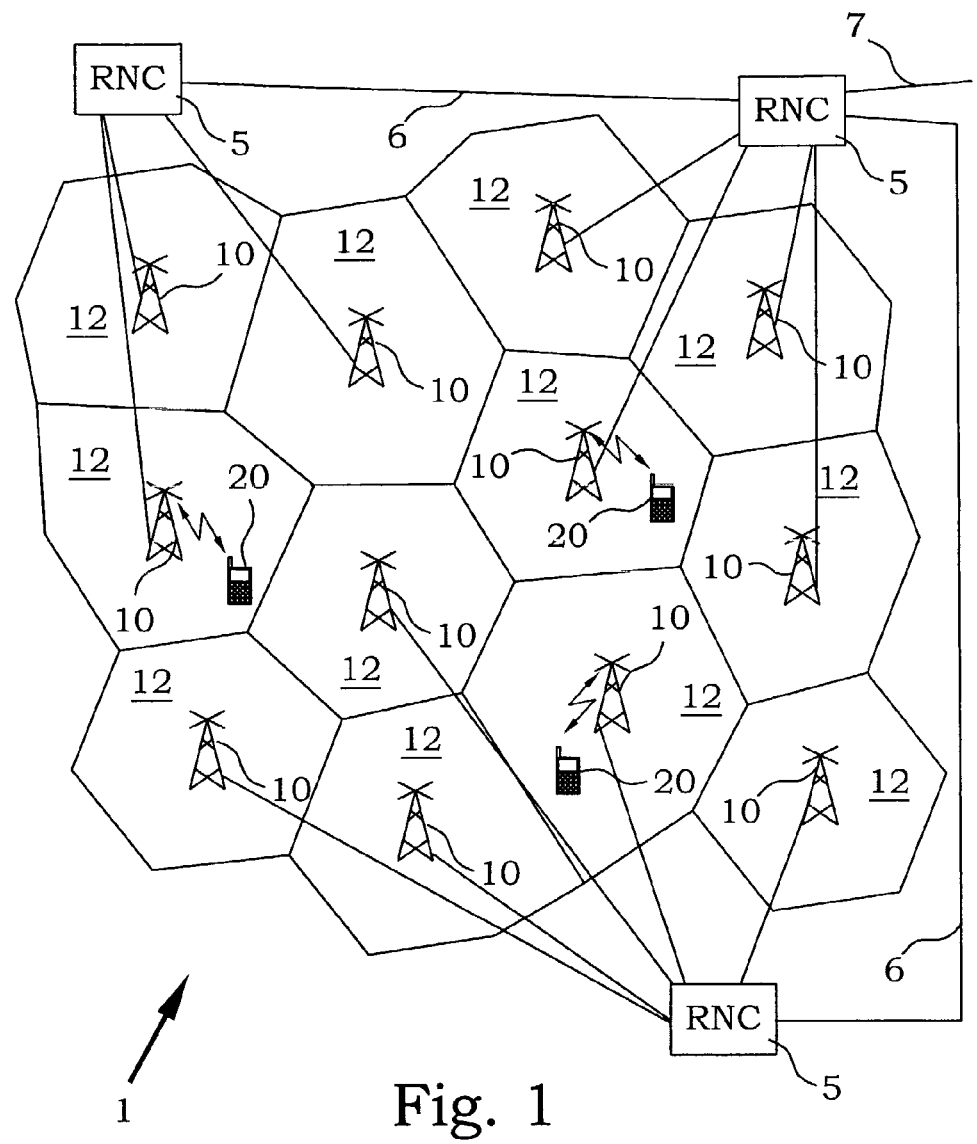
FIG. 1 is a schematic illustration of a cellular communication system, in which the present invention can be used.

FIG. 1 schematically illustrates a cellular communication system 1 in which omni-directional antennas are used. The area covered by the system is divided in cells 12. Each cell has a stationary base station 10, which is responsible for the radio communication with mobile units 20 positioned within the area of respective cell 12. The base stations 10 are connected to a common network 6 comprising radio network controllers (RNC) 5 and connections 7 to external networks. As is easily understood, a stationary base station 10 can have access to detailed altitude maps of the area covered by the respective cell 12. However, a mobile unit 20, which can be moved from cell to cell may not permanently store information of altitude maps of all possible cells. In order to be able to estimate the altitude, the mobile unit 20 has to be provided with data, making it possible to create a model of the altitude map of the present cell.

Similarly, if a base station 10 or a RNC 5 needs altitude information of another cell, data may have to be communicated within the system nodes.

FIG. 2a illustrates the principles of operation of devices belonging to the cellular system of e.g. FIG. 1. A first node, in this case the base station 10 is provided with altitude map data 16. This can be performed at the set-up of the system or at any later occasion. The altitude map data 16 can optionally be stored in the base station 10 in a memory 11. The base station 10 comprises means 14 for compressing the large amount of data into a limited data amount. In the present invention, the compressed data is represented by a set of points 15, having two lateral coordinates and an altitude parameter for each point. The set of points 15 represents a closed polygon associated with the cell boundary, whereby the set has to comprise at least three points. Data representing the set of points 15 is transferred 18 to a second node, in this case a mobile unit 20. The transferring takes place via a communication arrangement, typically comprising a transmitter 13 of the base station 10 and a receiver 23 of the mobile unit 20.

The first node may also be e.g. a RNC. The transferring means then comprises all communication means on the way to the second node. The communication between a RNC and a mobile unit may e.g. be performed via a base station, which in such a case constitutes a part of the transferring means. The first node can also be any other node comprised by or connected to the communication system.

The first node may even be a mobile unit, in particular in cases where the mobile unit has a relatively high storage capacity, allowing for carrying large amounts of map data, which may be of interest for stationary nodes within the system or other mobile units.

In cases when the second node is a stationary node, e.g. a base station or a RNC, data transfer may be performed solely via wired connections, and the communication arrangement are adapted accordingly. The invention is thus not limited to radio communication.

Returning to FIG. 2a, the mobile unit 20 interprets the point data and an evaluation means 24 uses it for creating an altitude model of the cell in question. Preferably, the created altitude model is stored in a memory 21 during the period of time the mobile unit 20 remains in one and the same cell. The lateral coordinates 26 of a point belonging to the cell can be input into the model and an estimate of the corresponding altitude 22 can be obtained.

Alternatively, the compression of data can be performed elsewhere and the result of the compression can be provided to the base station 10 instead of the original map data. This situation is schematically illustrated in FIG. 2b. Point data 15 is provided to the base station 10 and stored in the memory 11. When needed, the point data is retrieved and provided to the communication arrangement for forwarding to the mobile unit. The memory 11 can here be interpreted as the point data providing means.

In order to describe the invention in detail, a few words on the coordinate systems are needed. Ellipsoid models of the earth are typical choices. One is the so-called WGS 84 Ellipsoid model. There are also other ellipsoid models, e.g. Bessel ellipsoid. A spherical earth model is another simplified alternative.

The reference system chosen for the coding of locations is the World Geodetic System 1984, (WGS 84), which is also used by the Global Positioning System, (GPS). The origin of the WGS 84 co-ordinate system is the geometric center of the ellipsoid. The ellipsoid is spanned by an ellipse rotated around the North-South minor axis. The rotation axis is the polar axis of the ellipsoid, and the plane orthogonal to it and including the center of symmetry is the equatorial plane.

Figure 3:
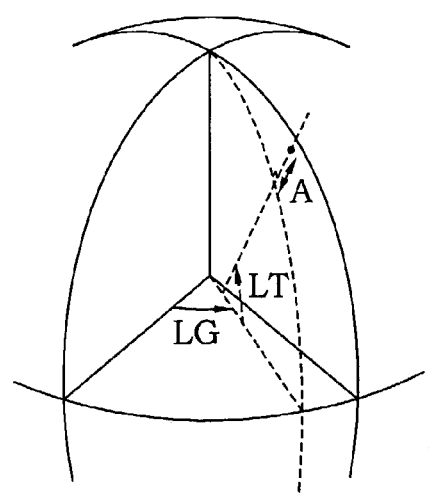
FIG. 3 is an illustration of a definition of latitude and longitude used in the present disclosure.

Co-ordinates are then expressed in terms of longitude and latitude relevant to this ellipsoid. FIG. 3 illustrates the definitions. The range of longitude LG is −180° to +180°, where 0° longitude corresponds to the Greenwich meridian, and positive angles are to the east, while negative angles are to the west. The range of latitude LT is −90° to +90°, where 0° latitude corresponds to the equator, and the north half of the earth corresponds to positive angles, while the south half of the earth have negative latitude angles. Altitudes are defined as the distance between the ellipsoid and the point, along a line orthogonal to the ellipsoid.

Figure 4:
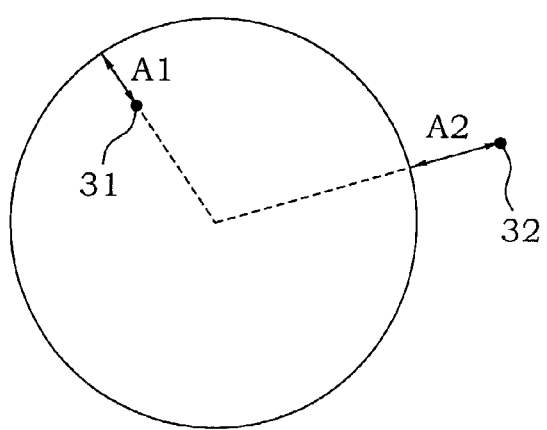
FIG. 4 is an illustration of a preferred altitude definition usable in the present invention.

Given a point on the surface of the earth, the altitude is defined as the vertical distance between the point and the earth ellipsoid. Depending on the coordinate system, the altitude may be counted positive or negative in the upward direction. In the present disclosure, the latter version will be used for simplicity. This choice is not of importance for the invention and either definition will work equally well. FIG. 4 illustrates an earth ellipsoid 30. Two points 31 and 32 are defined. Point 31 is situated inside the ellipsoid and the altitude A1 has therefore a negative value. Point 32 is situated outside the ellipsoid and the altitude A2 is hence positive.

Some main coordinate system alternatives, in which the positioning calculations according to the present invention can be carried out are listed next.

A first alternative is the so-called earth tangential coordinate system. This system is three-dimensional, Cartesian and has the origin at the surface of the earth model, at a latitude/longitude somewhere in the area of interest. The xy-plane is tangential to the earth model. One possibility is to have the x-axis pointing towards east, the y-axis pointing towards north and the z-axis pointing upwards. This system is right handed and normal coordinate transformation rules therefore apply. Measurement space handling is straightforward because of the Cartesian system.

Map coordinates constitute another good alternative. Here each latitude/longitude point on the surface of the earth model is transformed into map coordinates. Locally this map coordinate system is Cartesian, but globally it is warped. This means that straight lines between sites that are distant become curved in the map coordinate system. However, in the applications covered by this patent application, measurement distances are normally of the order of a few kilometers, a distance where this warping can be neglected. Therefore, map coordinates can also be used in connection with the described invention. An example of a commonly used projection is the so-called Universal Transversal Mercator projection.

With the above background description it is clear that it is generally valid to describe the invention with respect to a Cartesian three-dimensional coordinate system.

The present invention is strongly tied to a compression of the amount of data describing an altitude map. In the present invention, the reduced set of data is selected to be a set of points located essentially at the border of the cell it represents. The set of points comprises at least three points and represents a polygon approximating the cell boundary. This general format is then described by a set of ordered points, where each point is described in an embodiment by the triple:

$$P_{i,j}^{Earth} = (latitude_{i,j} \quad longitude_{i,j} \quad altitude_{i,j})^T.$$

Here $P_{i,j}^{Earth}$ denotes the ordered point i of the cell j. The superscript "Earth" denotes the coordinate system of the vector representation, which in this case is the earth centered system. It is assumed that there are N cells and that each polygon is represented by M(j) points. A transformation to either a map coordinate system or an earth tangential system then results in a vector:

$$P_{i,j}^{Cartesian} = (x_{i,j} \quad y_{i,j} \quad z_{i,j})^T$$

that represents the same point in an, at least locally Cartesian, coordinate system. Note that $z_{i,j} = altitude_{i,j}$ only holds in the origin of the Cartesian coordinate system in case the coordinate system is earth tangential with the origin on the surface of the earth model and in point i in cell j.

Figure 5:
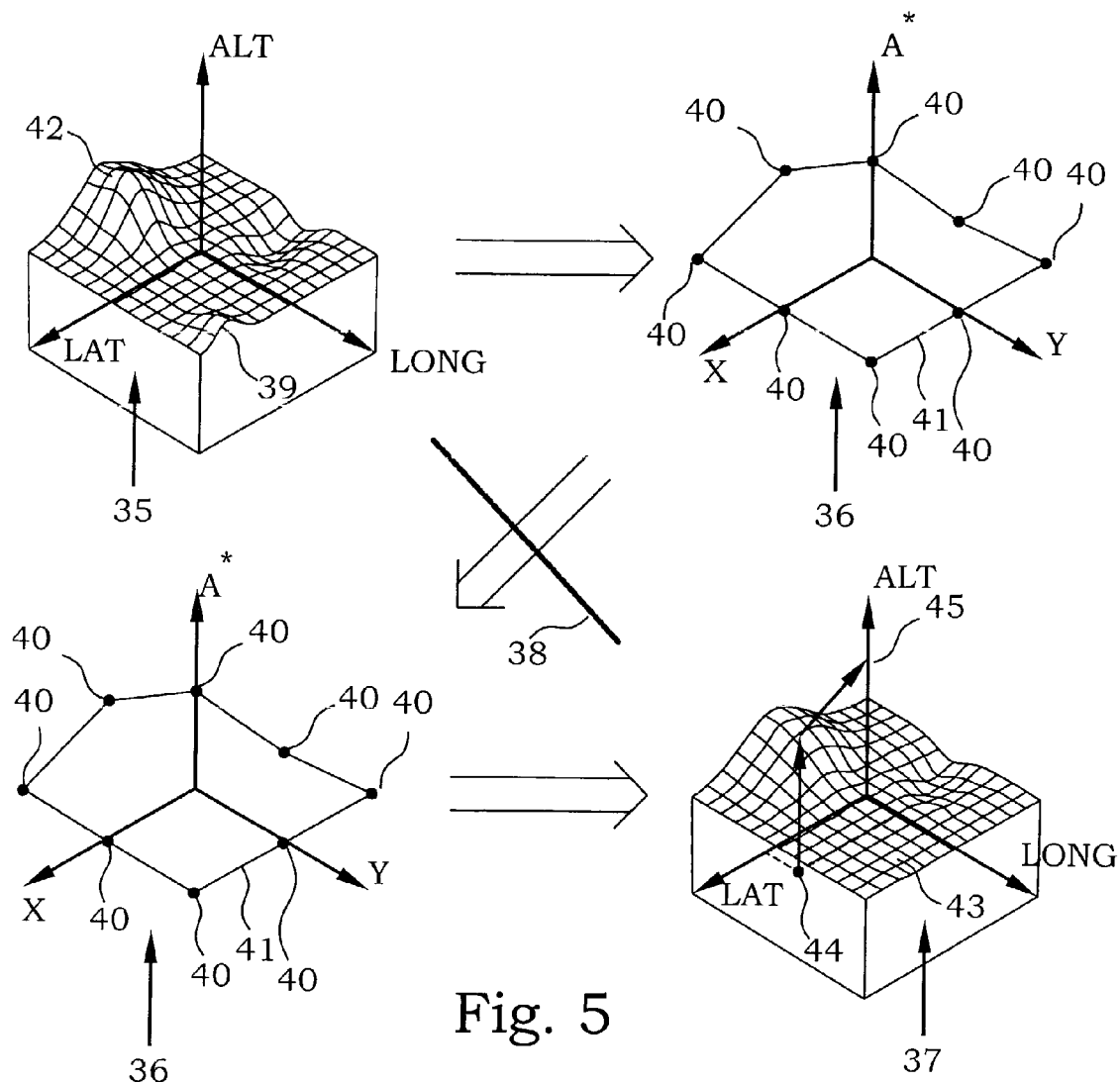
FIG. 5 is a schematic illustration of the conversion of data according to the present invention.

FIG. 5 illustrates the conversion of data according to the present invention. At the upper left corner, a diagram 35 illustrates an altitude map 42 of a cell with the boundary 39. This data is converted or reduced into a set of points 40 illustrated in the upper right corner by the diagram 36. The set of points defines a polygon 41 being essentially equal to the boundary of the cell. (Note that points of the set may actually be situated also between actual polygon corners. Such points may thus be interpreted as "corners" having a 180° opening angle.) The set of points is communicated over an interface 38 to another node, represented by the diagram 36 in the lower left corner. In order to describe the altitude values in interior points or boundary points not belonging to the set, using only the corners of the polygon a model needs to be imposed that describes the interior points as a function of the set of boundary points. Embodiments of such methods and models will be discussed in detailed further below. The model can be represented by a surface 43 in the diagram 37 in the lower right corner of FIG. 5. This surface 43 is thus an approximation of the surface 42 of diagram 35. By such a model, an interior or boundary point 44, i.e. a point belonging to the cell, has an associated altitude 45. The model could be expressed either in the earth coordinate system or any Cartesian system.

In a first embodiment, as a first simple case, a piecewise linear, cell internal modeling is described in connection with FIG. 6. In order to describe it in detail, it is assumed that each cell is described by a closed polygon consisting of M(j) points 40, in this illustrated example 7 points. Each cell is then divided into O(j) triangles 50, in this illustrated example 5 triangles.

Figure 6:
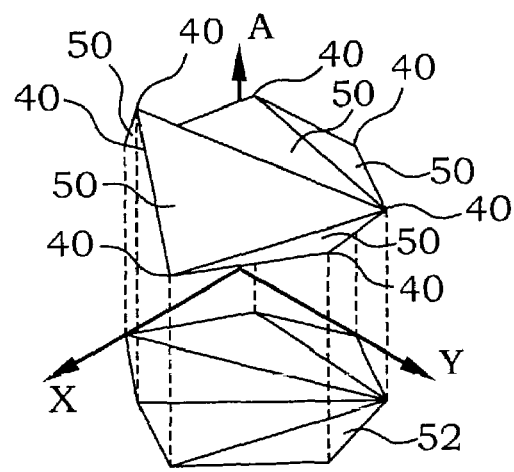
FIG. 6 is an illustration of an altitude model based on a piecewise linear model.

A projection 52 in the xy-plane is indicated in FIG. 6 as a support for the three-dimensional view. The support in the xy-plane of each of these triangles are denoted by $$T(P_{i_1(k),j}^{Cartesian}, P_{i_2(k),j}^{Cartesian}, P_{i_3(k),j}^{Cartesian}), k = 1, \cdots O(j).$$

The altitude values in the interior of the cell can then be described by the equation for a plane in three dimensions, i.e. by $$z - a_k x - b_k y - c_k = 0,$$
$$(x \quad y \quad 0)^T \in T(P_{i_1(k),j}^{Cartesian}, P_{i_2(k),j}^{Cartesian}, P_{i_3(k),j}^{Cartesian}) \subset \text{cell } j,$$
$$k = 1, \cdots O(j).$$

The three unknowns $a_k$, $b_k$ and $c_k$ can now be determined by insertion of the points $$P_{i_1(k),j}^{Cartesian} = (x_{i_1(k),j} \quad y_{i_1(k),j} \quad z_{i_1(k),j})^T$$
$$P_{i_2(k),j}^{Cartesian} = (x_{i_2(k),j} \quad y_{i_2(k),j} \quad z_{i_2(k),j})^T$$
$$P_{i_3(k),j}^{Cartesian} = (x_{i_3(k),j} \quad y_{i_3(k),j} \quad z_{i_3(k),j})^T$$

in the equation for the plane and then solving the third order system of equations that results. The altitude dependence within cell j is then modeled as $$z = a_k x + b_k y + c_k,$$

$$(x \quad y \quad 0)^T \in T\left(P_{i_1(k),j}^{Cartesian}, P_{i_2(k),j}^{Cartesian}, P_{i_3(k),j}^{Cartesian}\right) \subset \text{cell } j,$$

$$k = 1, \cdots O(j).$$

To conclude, it should be noted that the surface modeling with the technique of this section is performed after transferring of the set of boundary points with altitude from the database to the position calculation function. This essentially is the base line case where it is assumed that the altitude values of the cell computations do come from e.g. a digital map, i.e. they represent a true altitude in some sense.

Figure 7A:
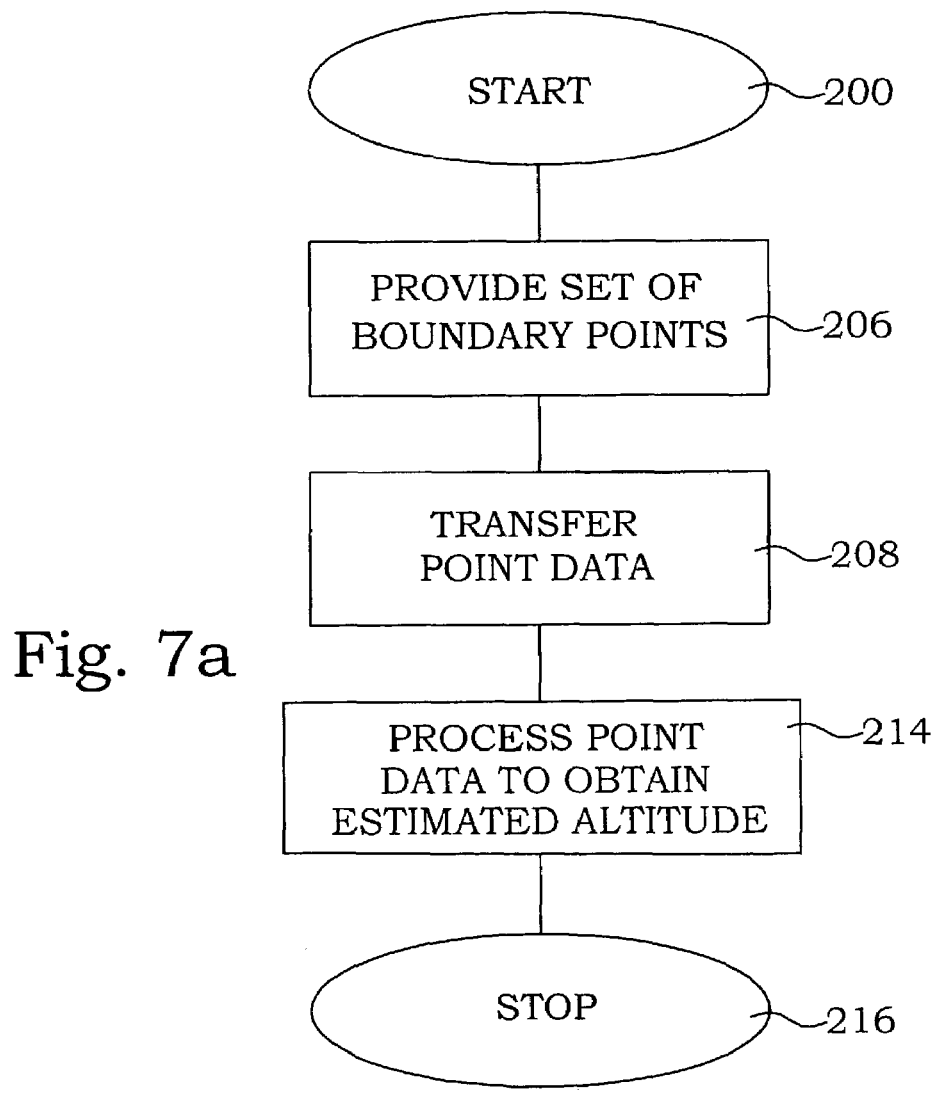
FIG. 7a is a flow diagram illustrating an embodiment of the main steps of a method according to the present invention.

In FIG. 7a, a method according to the present invention is illustrated. The process starts in step 200. In step 206, a set of points defining a cell boundary is provided in a first node. In step 208, data representing the set of points is transferred from the first node to a second node. In the second node, in step 214, the point data is processed for obtaining altitude information regarding points belonging to the cell in question. The process ends in step 216.

Figure 7B:
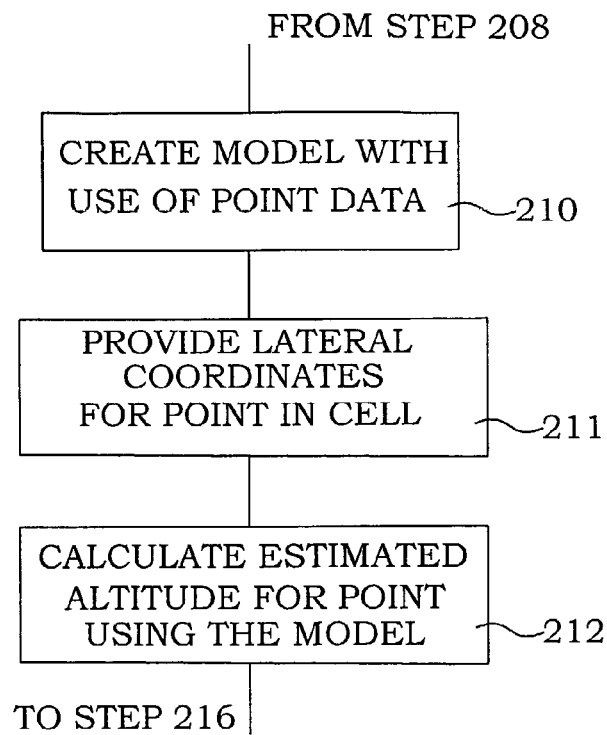

In FIG. 7b, a preferred embodiment of the step 214 in FIG. 7a is illustrated. In step 210, an altitude model is created, using the transferred data points as parameters. Lateral coordinates, i.e. coordinates in a horizontal plane, of a point of the cell, i.e. an interior or boundary point, are provided in step 211. In step 212, the lateral coordinates are used together with the created altitude model for calculating an estimate of an altitude of the cell point.

In the above embodiment, the true altitude of the boundary points in the set is used as the altitude parameter of the transferred data points. However, a minor modification of the altitude parameter may give an altitude model at the receiver node that represents the altitude of the entire cell interior in a better way. Thus, by sacrificing the absolute true altitude value of the boundary points of the set may improve the overall accuracy and reliability for the cell interior and the cell boundary not comprised in the set. In a preferred embodiment of the method according to the present invention, the provision of the set of points also comprises an optimization step. The optimization step uses altitude information about additional points of the cell, interior or boundary, to optimize the altitude parameters of the set of boundary points in order to give an as accurate as possible altitude model at the receiver end. At least one additional point of the cell has to be used, but obviously, the more points used, the more accurate the model will be. The most preferred method is to use the entire cell for the optimization. The optimization may also use all, or a subset of, the set of boundary points, themselves. For performing this optimization, different optimization algorithms or methods are possible to use, together with different kinds of optimization criteria. Some examples of suitable algorithms and criteria are discussed more in detail below.

When performing the optimization, the optimization is performed assuming the use of a particular model in the final altitude estimation. It is thus preferred if the altitude model used in the receiver node is identical to the model used in the optimization process in the originating node. However, even if the models are differing somewhat, an optimization using one model will in many cases anyway improve the accuracy of another altitude model, since both models are intended to describe the same three-dimensional surface.

In the piecewise linear, cell internal modeling, described, an optimization may alter the altitude parameters of the boundary points of the set in order to achieve a better resemblance between the actual altitude map and the quite crude linear estimation model. If, for instance, a significant interior area has a higher altitude than the boundary points, the errors in the altitude estimation using true altitudes as altitude parameters will be large. However, by increasing the altitude parameters of some of the boundary points of the set may significantly reduce the altitude errors in the interior of the cell, while still keeping the introduced errors at the boundary points themselves low. The overall altitude representation may therefore be improved.

Figure 7C:
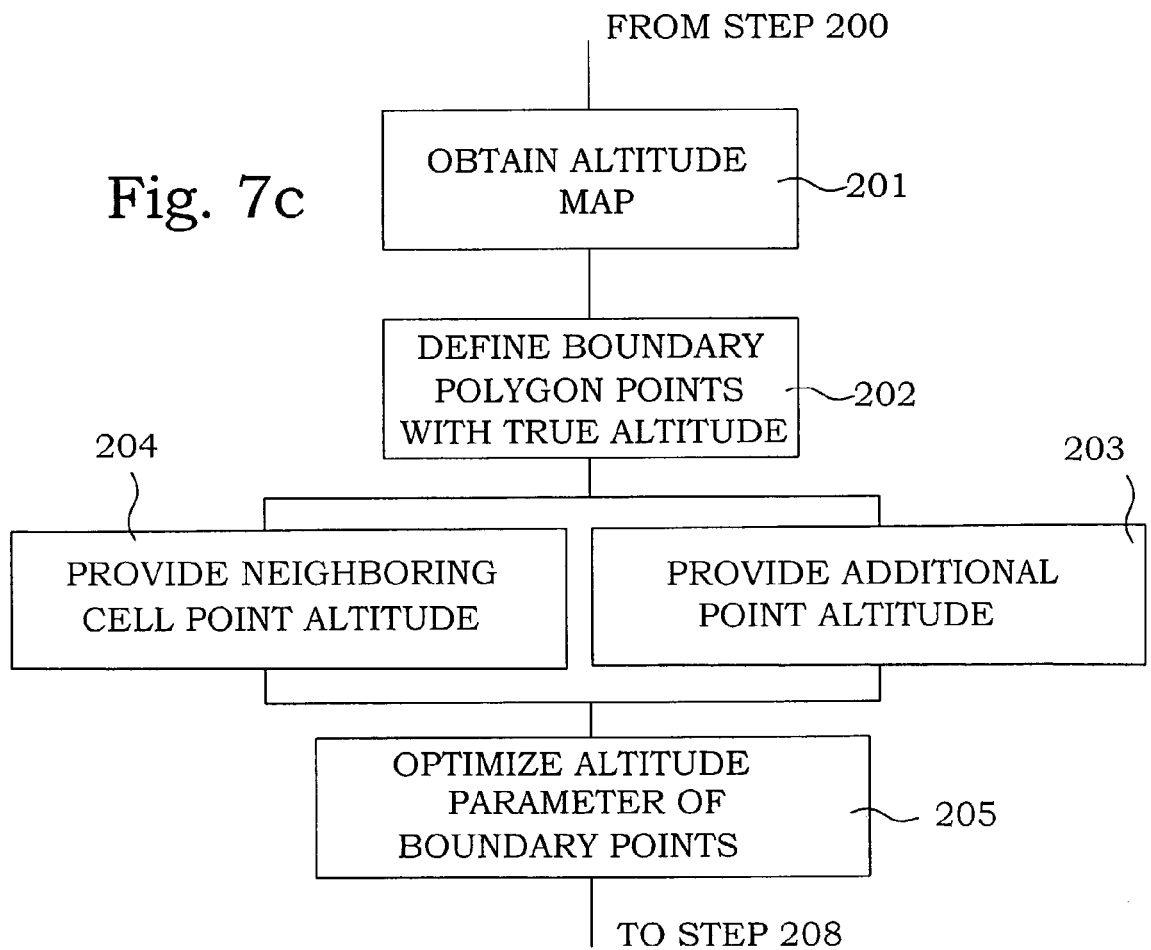

In FIG. 7c, a preferred embodiment of the step 206 in FIG. 7a is illustrated. In step 201, an altitude map of the cell is obtained. In step 202, boundary polygon points with true altitudes are defined. These two steps are typically also performed in embodiments without optimization steps. However, preferably, at least one additional point is provided, including the true altitude, as illustrated by step 203. Most preferably, a multitude of points or data representing the entire cell are provided. In step 205, the altitude parameters of the polygon points are optimized with respect to the data representing the altitudes of the additional points.

Other additional data can also be used for optimizing the altitude parameters. One possibility is to use information about the altitudes in neighboring cells. Even if the neighboring cells do not directly influence the altitudes within the cell in question, the overall altitude map is often a somewhat smoothened function of the lateral coordinates. Information about the altitudes outside, but in the vicinity of, the cell boundary may give additional information, e.g. on suitable gradients of the altitude model at the cell boundary. In FIG. 7c, step 204 illustrates the provision of such altitude data of neighboring cells, which then is used in the optimization step 205, preferably together with the data of the cell interior. Either of the steps 203 and 204 can thus be performed, providing a basis for optimization, but preferably, both steps are performed.

One of the key-points of the present invention is to find a way of representing a three-dimensional surface by just a few parameters, in order to allow the information to easily be communicated over an interface between different nodes in a cellular communication network. Such a communication will then require less bandwidth than if an entire altitude map has to be communicated. In such a context it is important also that the format of a digital signal by which the data is communicated is compatible with standards of systems that are going to be used in the future. In a preferred embodiment, the digital signal format is an extension of the existing 3GPP GAD formats, see e.g. [1]. Such an embodiment will be described below. However, it should be noted that also other types of communication formats can be used within the scope of the present invention.

FIG. 8 thus illustrate a digital signal format possible to be used within the present invention. Each row describes an octet, and the total number of octets is determined by the number of points. The first octet includes a header of a shape type description field of four digital bits. A certain digital combination will inform any user that the present extended format is to be used. The first octet also comprises a number of points field, which is encoded in binary on four bits. The number of points N in the description ranges from 3 to 15. Each point will be described by 8 octets, see here below.

The total number of octets will be 8N+1, where N is the number of points, i.e. the number of octets of the format will range from 25 to 121, depending on the number of points.

The description of each point will be divided into three parts. A latitude is defined by the first three octets, i.e. 24 bits. One bit is used to define the sign and a number ranging between 0 and $2^{23}-1$ is coded in binary on 23 bits. The number K can be translated into latitude X (in degrees) following the relation:

$$K \leq \frac{2^{23}}{90} X < K+1.$$

For $K=2^{23}-1$, the range is extended to include also $K+1$.

A longitude is defined by the next three octets, i.e. 24 bits. The longitude is represented by a number between $-2^{23}$ and $2^{23}-1$, corresponding to $-180°$ and $180°$. The number is coded in 2's complement binary on 24 bits. The following relation:

$$M \leq \frac{2^{24}}{360} Y < M+1$$

explains the relation between the number M and the longitude Y in degrees.

An altitude parameter is represented by the two last octets in each group. The altitude parameter can be a true altitude or an optimized altitude parameter as described further above. One bit defines the direction of altitude, as defined further above. A bit value 0 expresses in this embodiment height and a bit value 1 expresses depth. The actual altitude A is encoded using a 15 bit coded number H, in increments of 1 meter. A relation between the number H and the altitude (in meters) follows the relation:

$H \leq A < H+1$.

For $H=2^{15}-1$, the range is extended to include all greater values of the altitude.

The above digital signal format will easily be integrated together with existing 3GPP GAD formats.

In many cases, the simple embodiment using a piecewise linear, cell internal modeling is insufficient to give an appropriate altitude model. A different approach to the modeling problem within the cell is to adopt a polynomial model in two variables together with a least squares approach. Therefore, the altitude model $$z = \sum_{l=0}^{P(j)} \sum_{m=0}^{Q(j)} d_{lm} x^l y^m$$

is postulated. It should be noted that a number of other functional expansions can be used for the same purpose, it is e.g. possible to translate the co-ordinates so that when $x=y=0$ then the point corresponds to the origin of the Cartesian system referred to above. However, the above model is particularly suitable since it is linear in the unknown $d_{lm}$ that determines the surface. In this algorithmic variant, these unknowns will be determined from the points that define the corners of the polygon.

To be able to do so, note that the surface model above can be written as $z = f^T(x,y)d$ where $f(x,y) = (1 \; y \ldots y^{Q(j)} \; x \; xy \ldots xy^{Q(j)} \ldots x^{P(j)} \; x^{P(j)} y \ldots x^{P(j)} y^{Q(j)})^T$ $d = (d_{00} \; d_{01} \ldots d_{0Q(j)} \; d_{10} \; d_{11} \ldots d_{1Q(j)} \ldots d_{P(j)0} \; d_{P(j)1} \ldots d_{P(j)Q(j)})^T$.

This is now in a form where least squares modeling can be directly applied.

Assume now that the number of points of the polygon fulfils $M(j) \geq (Q(j)+1)(P(j)+1)$. Then there are at least as many data points as there are unknowns and the least squares problem should be well defined. To formulate this least-squares solution in detail, define the modeling error as:

$$E(d) = \sum_{i=1}^{M(j)} \|z_{i,j} - f^T(x_{i,j}, y_{i,j})d\|_2^2 = \sum_{i=1}^{M(j)} (z_{i,j} - f^T(x_{i,j}, y_{i,j})d)^2$$

Differentiation of this equation with respect to the components of d results in the following requirement for an optimum d $$0 = \frac{\partial E(d)}{\partial d}$$
$$= \sum_{i=1}^{M(j)} (z_{i,j} - f^T(x_{i,j}, y_{i,j})d) f^T(x_{i,j}, y_{i,j})$$
$$= \sum_{i=1}^{M(j)} (z_{i,j} - d^T f(x_{i,j}, y_{i,j})) f^T(x_{i,j}, y_{i,j})$$
$$= \sum_{i=1}^{M(j)} (z_{i,j} f^T(x_{i,j}, y_{i,j}) - d^T f(x_{i,j}, y_{i,j}) f^T(x_{i,j}, y_{i,j})).$$

The solution of this equation is obtained by straightforward manipulations, resulting in $$d = \left( \sum_{i=1}^{M(j)} f(x_{i,j}, y_{i,j}) f^T(x_{i,j}, y_{i,j}) \right)^{-1} \left( \sum_{i=1}^{M(j)} z_{i,j} f(x_{i,j}, y_{i,j}) \right). \quad (1)$$

With the optimal vector d computed with the above equation, the altitudes in interior points of the cell are directly obtained by the original equation $z = f^T(x,y)d, (x \; y \; 0) \in$ cell $j$.

Note that $(x \; y \; 0) \in$ cell $j$ means that the point in question is within the supporting polygon that defines the cell extension in the xy-plane.

Note that there are many other ways to implement the least squares solution than using the above formula (1). In particular, the inversions can be replaced by the solution of a system of equations.

Figure 9A:
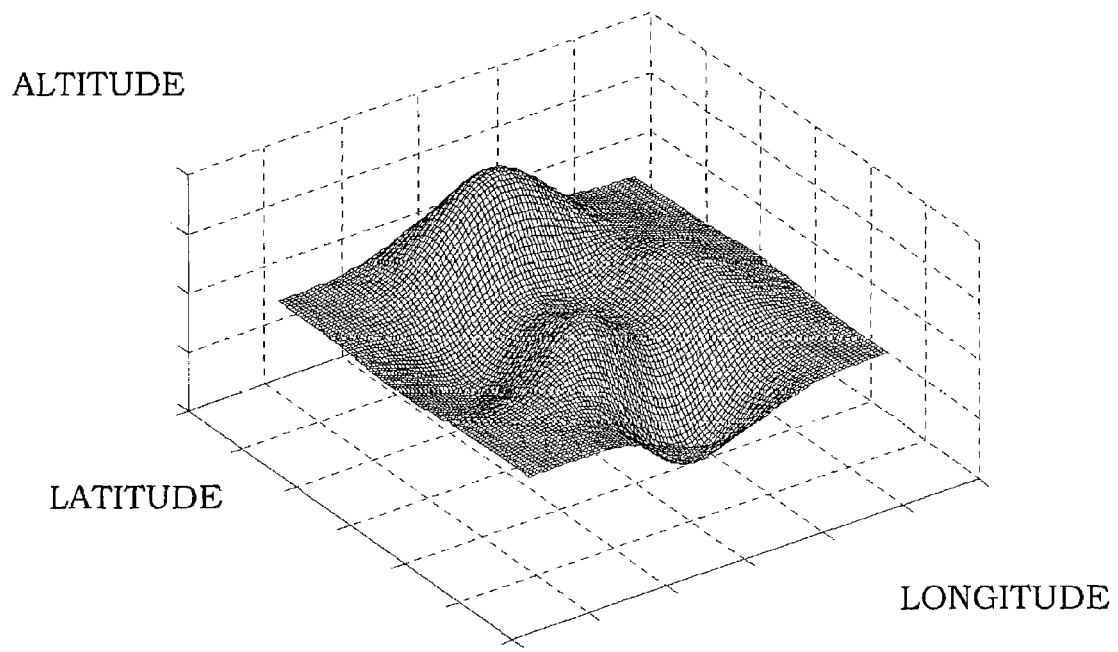
FIG. 9a illustrates an altitude map.
Figure 9B:
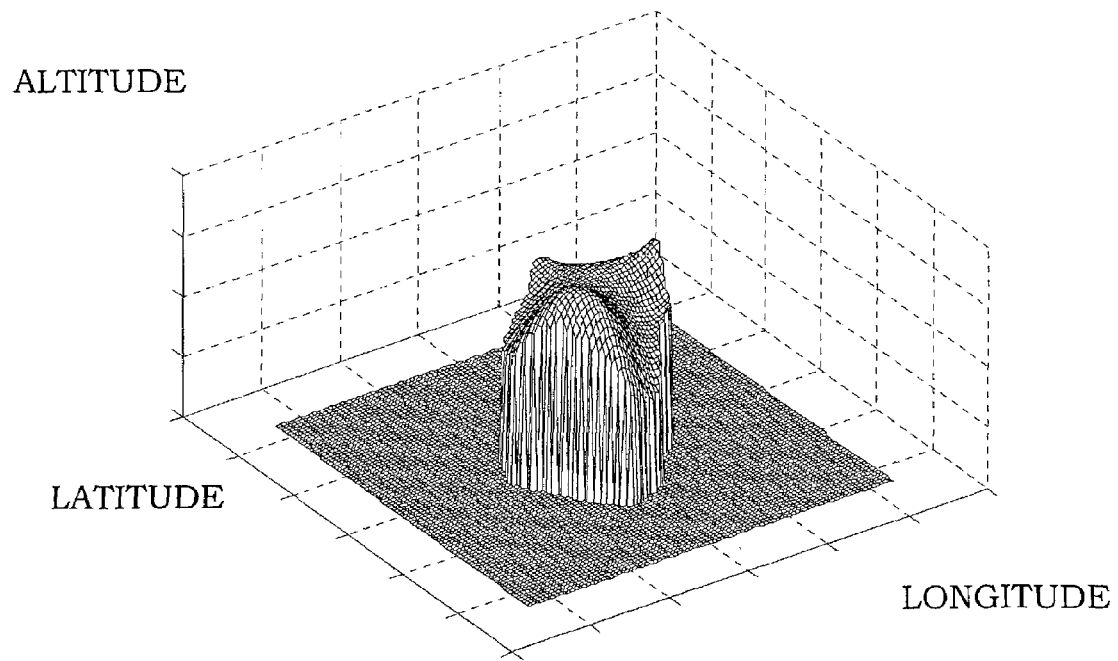
FIG. 9b illustrates estimated altitudes within a cell according to the present invention, using a polynomial in two variables, single cell least squares boundary point model.
Figure 9C:
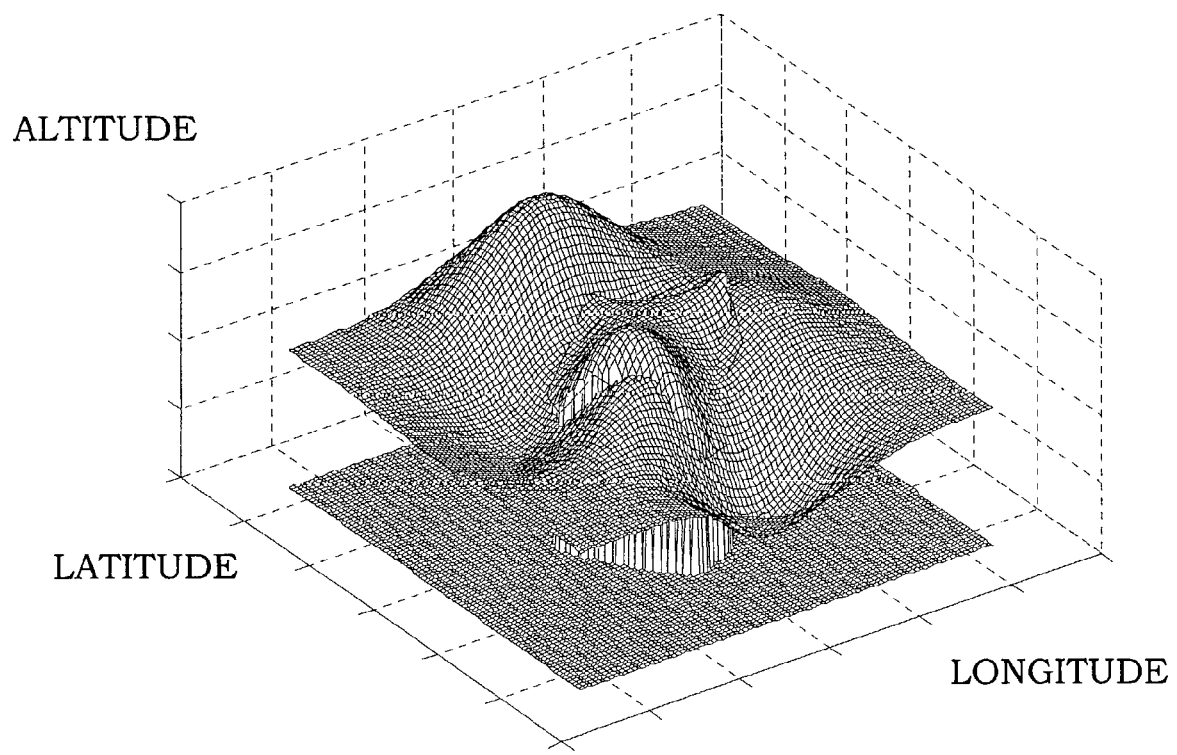
FIG. 9c illustrates the surfaces of FIGS. 9a and 9b superimposed.

As an illustration of what can be achieved, the method was implemented in MATLAB™. In this case a 16 corner polygon covered a subset area of the altitude surface illustrated in FIG. 9a. The surface approximated by the model in the interior of the polygon is plotted in FIG. 9b. FIG. 9c illustrates the surfaces of FIGS. 9a and 9b superimposed. As can be seen, the approximation, which is of third order, is remarkably accurate. There is in fact a mathematical explanation for this that provides a further motivation for the method. This explanation is valid for so called analytical functions. An analytical function is a complex function of a complex variable that has smooth derivatives of all orders. Two important properties of such functions are the following two (which are reproduced without complete mathematical rigor here, see [2] for details):

Property 1: An analytic function can be expanded in an infinite power series that converges uniformly to the analytical function in the interior of a region where the function is analytic.

Property 2: The interior values of a function in a region where the function is analytic are completely determined from its values on the boundary of this region.

Property 2 follows obviously directly from Cauchy's integral formula:

$$f(z_0) = \frac{1}{2\pi i} \iint_{Boundary} \frac{f(z)dz}{z - z_0},$$

$z_0$ within boundary.

Now, by taking real (or imaginary) parts of the surface that is modeled, the model above can be interpreted as the real part of a truncated power series of an analytical function, hence the power series (if completely known) would represent the analytical surface. In the method above, the analytical power series is determined from a subset of the values on the boundary determined by the polygon rather than the entire boundary. Thus, the model of the surface should become increasingly close to the actual surface when the number of terms in the power series and the number of corners on the polygon increase. However, since a general requirement is that the data amount to communicate should be limited, the power series is preferably truncated relatively early and the boundary points are limited in number, e.g. to less than 16, to fit the data format described above.

The idea of the algorithm above was to exploit the signaled boundary points of the polygon to compute a surface that models the altitude of the interior of the cell. However, as described further above, modeling may be improved by optimizing the altitude parameters with respect to interior points of the real altitude map.

Using polynomials in two variables, least squares interior point modeling can be used for optimizing the altitude parameters. In order to describe the method, it is without loss of generality assumed that $M(j)=(Q(j)+1)(P(j)+1)$ If this is not the case, terms of the polynomial expansion can easily be added or deleted until the number of corners of the polygon equals the number of unknown parameters of the polynomial expansion in two variables. Then, it follows exactly as in the previous section that:

$$z = \sum_{i}^{M(j) \text{ terms}} \sum_{m} d_{lm} x^l y^m = f^T(x, y)d, \quad (x \ y \ 0) \in \text{cell } j$$

$$f(x,y) = (1 \ y \ \ldots \ x \ xy \ \ldots \ x^\alpha \ x^\alpha y \ \ldots)^T$$

$$d = (d_{00} \ d_{01} \ \ldots \ d_{10} \ d_{11} \ \ldots \ d_{\alpha 0} \ d_{\alpha 1} \ \ldots)^T,$$

where $\alpha$ is an integer. Now, an error is formed as a sum over interior points. The number of points, $N_P$, should be sufficiently large to secure that the least squares solution is not singular. In the present section the points may be any selection of interior and boundary points of the own cell. The criterion and the corresponding solution become $$E(d) = \sum_{n=1}^{N_P} \|z_n - f^T(x_n, y_n)d\|_2^2 = \sum_{n=1}^{N_P} (z_n - f^T(x_n, y_n)d)^2$$

$$d = \left( \sum_{n=1}^{N_P} f(x_n, y_n) f^T(x_n, y_n) \right)^{-1} \left( \sum_{n=1}^{N_P} z_n f(x_n, y_n) \right).$$

Note that $(x_n \ y_n \ z_n)^T$ here denotes any point in the own cell.

The d parameters may then be transferred to the second node in the proposed format as altitude parameters instead of the actual altitude. The order in which the d parameters are transferred is in principle arbitrary, as long as the first and second nodes use the same definition. One possible order could be to transfer the d parameters in the order indicated in the equations above, with the first d parameter as altitude parameter of point 1, the second d parameter as altitude parameter of point 2 etc. The second node can then reproduce the model and use it for determining altitudes within the cell.

It is of course also possible to extend the optimization to include also adjacent cells, as mentioned above, when the altitude model parameters of a specific cell is computed. The mathematics is exactly as in the previous section, with the exception that $(x_n \ y_n \ z_n)^T$ may now be a point also outside of the own cell.

As a further embodiment of a model for use with the present invention, spline models can be used. A spline model can be understood as a piecewise polynomial model. An important advantage is that it allows for continuous and even smooth (differentiable) borders between cells, a fact that could be practically important. Details about using spline models can e.g. be found in [3].

Anyone skilled in the art understands that also other functional forms of the altitude model can be used, including e.g. models being non-linear in the parameters.

When performing an optimization, different optimization methods and optimization criteria functions may be used. The least squares criterion function is probably the most applicable. A weighted least squares criterion could e.g. be used if mobile stations are believed to be positioned much more frequently in certain parts of the cell than in other. Also other functional forms are possible to use.

When discussing optimizing methods, simple analytical solutions are practically limited to simple models. For more elaborate models, it is believed that more complex methods may be required, such as Kalman filtering, Extended Kalman filtering (see e.g. [4]), recursive least squares methods (see e.g. [5]) and non-linear optimization methods (see e.g. [6]).

It will be understood by those skilled in the art that various modifications and changes may be made to the present invention without departure from the scope thereof, which is defined by the appended claims.

REFERENCES

[1] 3GPP TS 23.032 v4.0.0, "Universal Geographical Area Description (GAD)", April, 2001.
[2] V. Churchill, J. W. Brown and R. F. Verhey, "Complex variables and applications", McGraw Hill, 3rd edition, Singapore, 1974, pp. 129-130, 141-169.
[3] C. de Boor, "A Practical Guide to Splines", Springer Verlag, New York, 1985, pp. 49-62.
[4] T. Söderström, "Discrete-time Stochastic Systems—Estimation and Control", Prentice Hall, 1994, Chap. 9, pp. 233-243.

[5] L. Ljung, T. Söderström, "Theory and Practice of Recursive Identification", MIT Press, 1983, pp. 16-22.
[6] D. G. Luenberger, "Introduction to Linear and Nonlinear Programming", Addison-Wesley, Reading, Mass., USA, 1973, chap. 6-14.

The invention claimed is:

1. Altitude determination method in a cellular communication system comprising the steps of:
    providing a set of points in a first node in said cellular communication system;
    said set of points comprising at least three points located at or near a border of a first cell associated with said first node;
    said at least three points each comprising two coordinates of a horizontal plane and an altitude parameter;
    transferring a data amount representing said set of points over an interface between said first node and a second node of said cellular communication system; and
    processing, in said second node, said data amount to obtain an estimated altitude of any first point belonging to said first cell using coordinates of a horizontal plane of said any first point as input arguments.

2. Altitude determination method according to claim 1, wherein said processing step comprises the steps of:
    creating a first altitude model using said transferred data amount; and
    calculating said estimated altitude from said first altitude model, using coordinates in said horizontal plane for said first point as parameters.

3. Altitude determination method according to claim 2, wherein said first altitude model is of a type selected from the list of:
    piecewise linear model;
    polynomial model in two variables; and
    spline model.

4. Altitude determination method according to claim 1, wherein said altitude parameter of each of said at least three points is an actual altitude of said first cell at respective point.

5. Altitude determination method according to claim 1, wherein said providing step comprises the steps of:
    retrieving said set of points from a data storage.

6. Altitude determination method according to claim 1, wherein said providing step comprises the steps of:
    obtaining an actual altitude for at least one additional point, interior or boundary, of said first cell;
    determining said altitude parameter of each of said at least three points according to a second altitude model;
    said determining step comprising optimization with respect to said at least one additional point.

7. Altitude determination method according to claim 6, wherein optimization is performed with respect to at least one of said at least three points.

8. Altitude determination method according to claim 6, wherein said second altitude model is of a type selected from the list of:
    piecewise linear model;
    polynomial model in two variables; and
    spline model.

9. Altitude determination method according to claim 6, wherein said second altitude model is the same as said first altitude model.

10. Altitude determination method according to claim 6, wherein said optimization is based on a criterion function selected from the list of:
    least squares criterion function; and
    weighted least squares criterion function.

11. Altitude determination method according to claim 6, wherein said optimization is performed using an optimization method selected from the list of:
    least squares;
    recursive least squares;
    Kalman filtering; and
    non-linear optimization.

12. Altitude determination method according to claim 6, further comprising the step of:
    obtaining an actual altitude for at least one point of at least a second cell of said cellular system that is adjacent to said first cell;
    whereby said determining step is based on said at least one point of said second cell.

13. Altitude determination method according to claim 1, wherein said first node is a unit selected from the list of:
    a base station of said first cell;
    a radio network controller connected to a base station of said first cell; and
    a mobile unit.

14. Altitude determination method according claim 1, wherein said second node is a unit selected from the list of:
    a mobile unit located within said first cell;
    a base station of said cellular communication system; and
    a radio network controller of said cellular communication system.

15. Altitude determination method according to claim 1, wherein said at least three points are less than 16.

16. Altitude determination method according to claim 1, wherein coordinates used in said altitude determination method are coordinates of a Cartesian three-dimensional coordinate system.

17. Altitude determination method according to claim 16, wherein said Cartesian three-dimensional coordinate system is an earth tangential coordinate system.

18. Altitude determination method according to claim 16, wherein coordinates used in said altitude determination method are map coordinates.

19. Altitude determination method according to claim 1, wherein said data amount is transferred by signals in a format, comprising a header stating that said data amount represents a polygon with altitude information and a parameter stating the number of points.

20. Altitude determination method according to claim 19, wherein said format further comprises two 24 bits coordinates in said horizontal plane and a 16 bit altitude parameter per point.

21. Altitude determination method according to claim 20, wherein said coordinates in said horizontal plane follow a coding scheme of latitude and longitude of a 3GPP GAD polygon format and said altitude parameter follows a coding scheme of an altitude of a 3GPP GAD ellipsoid point with altitude format.

22. Altitude determination method in a node in a cellular communication system comprising the steps of:
    receiving a data amount representing a set of points over an interface;
    said set of points comprising at least three points located at or near a border of a first cell;
    said at least three points each comprising two coordinates of a horizontal plane and an altitude parameter; and
    processing said data amount to obtain an estimated altitude of any first point belonging to said first cell using coordinates of a horizontal plane of said any first point as input arguments.

23. Altitude determination method according to claim 22, wherein said processing step comprises the step of:

creating an altitude model using said transferred data amount; and calculating said estimated altitude from said altitude model, using coordinates in said horizontal plane for said first point as parameters.

24. Altitude determination method according to claim 23, wherein said altitude model is of a type selected from the list of:
piecewise linear model;
polynomial model in two variables; and
spline model.

25. Altitude determination method according to claim 22, wherein said at least three points are less than 16.

26. Altitude determination method according to claim 22, wherein said data amount is received by signals in a format comprising a header indicating that said data amount represents a polygon with altitude information and a parameter indicating the number of points.

27. Altitude determination method according to claim 26, wherein said format further comprises two 24 bits coordinates in said horizontal plane and a 16 bit altitude parameter per point.

28. Altitude determination method according to claim 27, wherein said coordinates in said horizontal plane follow a coding scheme of latitude and longitude of a 3GPP GAD polygon format and said altitude parameter follows a coding scheme of an altitude of a 3GPP GAD ellipsoid point with altitude format.

29. Method for provision of altitude information in a node in a cellular communication system comprising the steps of:
providing a set of points;
said set of points comprising at least three points located at or near a border of a first cell being associated with said node;
said at least three points each comprising two coordinates of a horizontal plane and an altitude parameter; and
sending a data amount representing said set of points over an interface of said cellular communication system by signals in a format including a header that indicates that said data amount represents a polygon with altitude information and a parameter that indicates a number of points forming corners of the polygon.

30. according to claim 29, wherein said altitude parameter of each of said at least three points is an actual altitude of said first cell at respective point.

31. according to claim 29, wherein said providing step in turn comprises the steps of:
retrieving said set of points from a data storage.

32. according to claim 29, wherein said providing step in turn comprises the steps of:
obtaining an actual altitude for at least one additional point, interior or boundary, of said first cell;
determining said altitude parameter of each of said at least three points according to an altitude model;
said determining step in turn comprising optimization with respect to said at least one additional point. , 33. Method according to claim 32, wherein optimization is performed with respect to at least one of said at least three points.

34. Method according to claim 32, wherein said altitude model is of a type selected from the list of:
piecewise linear model;
polynomial model in two variables; and
spline model.

35. Method according to claim 32, wherein said optimization is based on a criterion function selected from the list of:
least squares criterion function; and
weighted least squares criterion function.

36. Method according to claim 32, wherein said optimization is performed using an optimization method selected from the list of:
least squares;
recursive least squares;
Kalman filtering; and
non-linear optimization.

37. Method according to claim 32, further comprising the step of:
obtaining an actual altitude for at least one point of at least a second cell of said cellular system, being adjacent to said first cell;
whereby said determining step is based also on said at least one point of said second cell.

38. Method according to claim 29, wherein said at least three points are less than 16.

39. Method according to claim 29, wherein said format further comprises two 24 bits coordinates in said horizontal plane and a 16 bit altitude parameter per point.

40. Method according to claim 39, wherein said coordinates in said horizontal plane follow a coding scheme of latitude and longitude of a 3GPP GAD polygon format and said altitude parameter follows a coding scheme of an altitude of a 3GPP GAD ellipsoid point with altitude format.

41. Cellular communication system comprising:
a first node associated with a first cell including means for providing a set of points that includes at least three points located at or near a border of said first cell;
said at least three points each comprising two coordinates in a horizontal plane and an altitude parameter;
a second node;
a communication arrangement for transferring data from said first node to said second node over an interface, whereby said communication arrangement is arranged for transferring a data amount representing said set of points;
said second node comprising a processor for processing said data amount for obtaining an estimated altitude of any first point belonging to said first cell using coordinates of a horizontal plane of said any first point as input arguments.

42. Cellular communication system according to claim 41, wherein said processor comprises:
means for creating a first altitude model using said transferred data amount; and
means for calculating said estimated altitude from said first altitude model, using coordinates in said horizontal plane for said first point as parameters.

43. Cellular communication system according to claim 42, wherein said first altitude model is of a type selected from the list of:
piecewise linear model;
polynomial model in two variables; and
spline model.

44. Cellular communication system according to claim 41, wherein said altitude parameter of each of said at least three points is an actual altitude of said first cell at respective point.

45. Cellular communication system according to claim 41, wherein said means for providing a set of points comprises:
storage means storing data representing said; and
means for retrieving said set of points.

46. Cellular communication system according to claim 41, wherein said means for providing a set of points comprises:
means for obtaining an actual altitude for at least one additional point, interior or boundary, of said first cell;

means for determining said altitude parameter of each of said at least three points according to a second altitude model;

said means for determining comprising optimization means for optimization with respect to said at least one additional point.

47. Cellular communication system according to claim 41, wherein said first node is a unit selected from the list of:
a base station of said first cell;
a radio network controller connected to a base station of said first cell; and
a mobile unit.

48. Cellular communication system according to claim 41, wherein said second node is a unit selected from the list of:
a mobile unit located within said first cell;
a base station of said cellular communication system; and
a radio network controller of said cellular communication system.

49. Cellular communication system node associated with a first cell, comprising:
data processing circuitry for providing a set of points comprising at least three points located at or near a border of said first cell;
said at least three points each comprising two coordinates in a horizontal plane and an altitude parameter;
a communication arrangement for sending data from said node over an interface,
wherein said communication arrangement is arranged for sending a data amount representing said set of points by signals in a format including a header that indicates that said data amount represents a polygon with altitude information and a parameter that indicates a number of points forming corners of the polygon.

50. Cellular communication system node according to claim 49, wherein said altitude parameter of each of said at least three points is an actual altitude of said first cell at respective point.

51. Cellular communication system node according to claim 49, wherein said data processing circuitry comprises:
storage for storing data representing said set of points;
means for retrieving said set of points.

52. Cellular communication system node according to claim 49, wherein said data processing circuitry comprises:
means for obtaining an actual altitude for at least one additional point, interior or boundary, of said first cell;
means for determining said altitude parameter of each of said at least three points according to a second altitude model;
said means for determining in turn comprising optimization means for optimization with respect to said at least one additional point.

53. Cellular communication system node according to claim 49, wherein said cellular communication system node is a unit selected from the list of:
a base station of said first cell;
a radio network controller connected to a base station of said first cell; and
a mobile unit.

54. Cellular communication system node comprising:
a communication arrangement for receiving data over an interface; and
a processor for processing a data amount received by said communication arrangement that represents a set of points;
said set of points comprising at least three points located at or near a border of a first cell;
said at least three points each comprising two coordinates in a horizontal plane and an altitude parameter;
whereby said processor is arranged to obtain an estimated altitude of any first point belonging to said first cell using coordinates of a horizontal plane of said any first point as input arguments.

55. Cellular communication system node according to claim 54, wherein said processor comprises:
means for creating an altitude model using said received data amount; and
means for calculating said estimated altitude from said altitude model using coordinates in said horizontal plane for said first point as parameters.

56. Cellular communication system node according to claim 55, wherein said altitude model is of a type selected from the list of:
piecewise linear model;
polynomial model in two variables; and
spline model.

57. Cellular communication system node according to claim 54, wherein said cellular communication system node is a unit selected from the list of:
a mobile unit;
a base station of said cellular communication system; and
a radio network controller of said cellular communication system.

* * * * *

UNITED STATES PATENT AND TRADEMARK OFFICE
CERTIFICATE OF CORRECTION

PATENT NO. : 7,676,232 B2
APPLICATION NO. : 10/146463
DATED : March 9, 2010
INVENTOR(S) : Wigren et al.

It is certified that error appears in the above-identified patent and that said Letters Patent is hereby corrected as shown below:

In Column 4, Line 55, delete "Co-ordinatcs" and insert -- Co-ordinates --, therefor.

In Column 9, Line 57, delete "$d_{im}$" and insert -- $d_{lm}$ --, therefor.

In Column 9, Lines 66-67, delete " $f(x,y)=(1\ y\ \ldots\ y^{Q(j)}\ x\ xy\ \ldots\ xy^{Q(j)}\ \ldots\ x^{P(j)}\ x^{P(j)}y\ \ldots\ x^{P(j)}y_{Q(j)})^T$ " and insert -- $f(x,y)=(1\ y\ \ldots\ y^{Q(j)}\ x\ xy\ \ldots\ xy^{Q(j)}\ \ldots\ x^{P(j)}\ x^{P(j)}y\ \ldots\ x^{P(j)}y^{Q(j)})^T$ --, therefor.

In Column 11, Lines 54-55, delete " $z = \sum_{l}^{M(j)\ terms} \sum_{m}$ " and insert -- $z = \sum_{l}^{M(j)\ terms} \sum_{m}$ --, therefor.

In Column 15, Line 43, in Claim 30, delete "according" and insert -- Method according --, therefor.

In Column 15, Line 46, in Claim 31, delete "according" and insert -- Method according --, therefor.

In Column 15, Line 49, in Claim 32, delete "according" and insert -- Method according --, therefor.

In Column 15, Line 56, in Claim 32, delete "point. ," and insert -- point. --, therefor.

Signed and Sealed this
Second Day of October, 2012

David J. Kappos
*Director of the United States Patent and Trademark Office*